United States Patent [19]

Rahman

[11] Patent Number: 4,997,934

[45] Date of Patent: Mar. 5, 1991

[54] CELLULOSE AMINOMETHANATE BY WEIGHT LOSS MONITORING

[75] Inventor: Matiur Rahman, Champaign, Ill.

[73] Assignee: Teepak, Inc., Westchester, Ill.

[21] Appl. No.: 365,271

[22] Filed: Jun. 12, 1989

[51] Int. Cl.$^5$ .......................... C08B 3/00; A22C 13/00
[52] U.S. Cl. ...................................... 536/30; 106/203; 8/125; 426/105
[58] Field of Search .............. 536/30; 106/203; 8/125; 138/118.1; 426/105

[56] References Cited

U.S. PATENT DOCUMENTS

| | | | |
|---|---|---|---|
| 1,771,461 | 7/1930 | Lilienfeld | 106/203 |
| 2,129,708 | 9/1938 | Schreiber | 106/203 |
| 2,134,825 | 11/1938 | Hill et al. | 536/30 |
| 3,291,789 | 12/1966 | Bridgeford | 536/61 |
| 3,557,082 | 1/1971 | Bridgeford | 536/61 |
| 4,404,369 | 9/1983 | Huttunen et al. | 536/30 |
| 4,456,749 | 6/1984 | Mandell et al. | 536/30 |
| 4,486,585 | 12/1984 | Turunen et al. | 536/30 |
| 4,526,620 | 7/1985 | Selin et al. | 536/30 |
| 4,530,999 | 7/1985 | Selin et al. | 536/30 |
| 4,567,255 | 1/1986 | Eklund et al. | 536/30 |
| 4,583,984 | 4/1986 | Turunen et al. | 8/125 |
| 4,639,515 | 1/1987 | Turunen et al. | 536/30 |
| 4,762,564 | 8/1988 | Bridgeford | 106/204 |
| 4,777,249 | 10/1988 | Bridgeford | 536/30 |
| 4,789,006 | 12/1988 | Bridgeford et al | 138/118.1 |

FOREIGN PATENT DOCUMENTS 85890246  4/1986  European Pat. Off. .

*Primary Examiner*—Nathan M. Nutter
*Attorney, Agent, or Firm*—Howard M. Ellis; Anna E. Mack; William J. Crossetta

[57] ABSTRACT

This invention relates to an improvement to a process for synthesizing cellulose aminomethanate wherein cellulose is steeped in an aqueous urea containing solution, dried to form an intimate mixture of cellulose and urea of known composition, and heated to form the cellulose aminomethanate; the improvement comprising, heating the mixture to a temperature above about 125 degrees centigrade, measuring the weight loss of the mixture during heating, comparing the measured weight loss of the mixture during heating to the weight of an equivalent amount of ammonia released in accord with the reaction path:

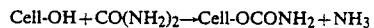

Cell-OH+CO(NH$_2$)$_2$→Cell-OCONH$_2$+NH$_3$ continuing heating until the total measured weight loss corresponds to the total weight of an amount of ammonia released in the reaction when from about 30 to about 100% of the total weight of urea present in the mixture reacts with cellulose. Cellulose aminomethanate manufactured in accord with this process, can be made having a uniform distributioon of substituent throughout the cellulose at the molecular level and comprises a consistently reproducable product for manufacturing sausage casing.

23 Claims, No Drawings

CELLULOSE AMINOMETHANATE BY WEIGHT LOSS MONITORING

BACKGROUND OF THE INVENTION

1. Field of the Invention

This invention relates to a process for monitoring the synthesis of cellulose aminomethanate which has utility in the manufacture of cellulose film, such as sausage casing and cellulose films.

2. History of the Prior Art

The replacement of viscose dissolved, modified cellulose film with the use of ammonia derivatives, such as urea, reacted with cellulose to form a soluble product is a technology which has been gaining acceptance in the sausage casing industry. The use of such materials, in replacement of the traditional viscose regenerated cellulose process, is preferable as by-products are easily managed and do not appear to represent significant environmental impact. U.S. Pat. Nos. 1,771,461; 2,134,825; and 2,129,708 comprise some of the early work in this technology and demonstrate that film products are obtainable. Though the final products formed showed potential for use as a film, it wasn't until U.S. Pat. No. 4,789,006 that film products were produced using urea and cellulose for use as sausage casings.

Various different terminology has been used to describe the products of cellulose and urea, such as cellulose aminoformates, cellulose carbamates, cellulose aminomethanoate and cellulose aminomethanates as adopted in U.S. Pat. No. 4,789,006. To deter further confusion, the products formed with cellulose and urea as presented in the above patents and hereinafter will be referred to as cellulose aminomethanates.

With recent improvements in cellulose aminomethanate technology, such as those described in U.S. patent applications Nos. 365,272 and 365,267 filed on even date herewith, entitled Cellulose Aminomethanate By Acid Neutralization (M. Rahman), Preparation of Cellulose Aminomethanate (M. Rahman and D. Bridgeford) and Cellulose Aminomethanate by Ion Exchange Extraction (D. Bridgeford), each herewith incorporated by reference, the manufacture of cellulose aminomethanate product has become more convenient and suitable for use in the large volumes required for the sausage casing industry. Problems still exist however, in the manufacturing process, occasioned by the difficulty of controlling the extent of reaction that takes place between the urea and the cellulose structure in forming the cellulose aminomethanate. Thus there is a need for a method of monitoring the urea/cellulose reaction which will allow increased control over the reaction to improve consistency and product quality in the manufacturing process.

It is an object of this invention to improve the process for the formation of cellulose aminomethanate by providing means for monitoring the urea/cellulose reaction.

It is another object of this invention to provide a cellulose aminomethanate material having improved processibility.

It is a further object of this invention to provide a convenient means for processing urea intermingled cellulose which is being treated by heating.

BRIEF DESCRIPTION OF THE INVENTION

The aforementioned objects and more are achieved by an improvement in the process for synthesizing cellulose aminomethanate, wherein cellulose is steeped in a urea containing solution, dried to form an intimate mixture of cellulose and urea of known composition, and heated to form the cellulose aminomethanate. The improvement comprises, heating the dried intimate mixture to a temperature above about 125 degrees centigrade, measuring the weight loss of the mixture during heating, comparing the measured weight loss of the mixture to the weight of an equivalent amount of ammonia released in accord with the reaction path:

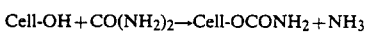

$$\text{Cell-OH} + \text{CO(NH}_2)_2 \rightarrow \text{Cell-OCONH}_2 + \text{NH}_3$$

continuing heating until the weight loss corresponds to the weight of an amount of ammonia released in the reaction when from about 30 to about 100% of the total weight of urea present in the mixture decomposes for reaction with cellulose.

It has been found that when cellulose aminomethanate is manufactured in accord with this process, a higher consistency in quality is obtained and the soluble product formed has clarity and filterability suitable for manufacturing a strong film.

DETAILED DESCRIPTION OF THE INVENTION

The synthesis of cellulose aminomethanate suitable for use in the manufacture of sausage casings involves at least two controlling elements. First, the cellulose structure of the material used must be impregnated with urea in a uniformly distributed manner to assure uniformity of reaction throughout the reaction mass. Second, the thus impregnated cellulose structure must then be thermally treated for a sufficient time and temperature to efficiently decompose the distributed urea and form the cellulose aminomethanate derivative without causing significant undesirable degradation to the cellulose backbone structure.

In order to achieve uniform distribution, it has been found that the hydrogen bonded networks and associated crystalline structure of cellulose need be broken to make the cellulose sufficiently accessible to the urea. In the process of U.S. Pat. No. 4,404,369 this accessibility is accomplished by steeping cellulose in a solution of urea in liquid ammonia, the liquid ammonia apparently acting to cause the cellulose to swell, which makes the cellulose more accessible to the urea. In U.S. Pat. Nos. 2,129,708 and 2,134,825, as well as European patent Office Application 85890246.3, the method of achieving distribution of the urea is by steeping cellulose in a solution of urea in aqueous sodium hydroxide at room temperature such that swelling of the cellulose structure is achieved and urea can theoretically be distributed therethrough.

The previously described co-pending applications, filed of even date herewith, address the discovery that low concentration caustic solutions, of minimum volume and low temperature, can be utilized in steeping, without multiple washings of the slurry with dilute aqueous urea as required by the prior art and without the concurrent material, energy and waste-product disposal costs associated therewith. These applications also disclose the use of acidic neutralizing solutions and the application of ion-exchange techniques to resolve sodium hydroxide effects.

It is apparent that though many of the problems associated with reactant uniformity and processing contaminants have been overcome, little has been done to monitor and control the reaction responsible for the formation of the cellulose aminomethanate and thus the quality of the soluble cellulose product remains inconsistent.

In the prior art, the conventional technique for achieving the urea/cellulose reaction is typically a batch processing technique wherein the intimate mixture is heated to a temperature of above about 130 degrees centigrade for a length of time seen as sufficient for the reaction to go to completion. Typically determining the end point of the process comprises taking multiple sequential samples which are tested to determine if an adequately soluble product has been attained which can be utilized to form a film. Thus, through the technique of trial and error the appropriate time and temperature for heating a batch is determined. As should be apparent, optimization of such time temperature technique is difficult due to the inherent variables of mass, pad geometry, heating uniformity, heat transfer uniformity and other associated problems. With such technique it was not unusual that product quality, particularly solubility, clarity or filterability varied significantly from batch to batch and even within samples from a single batch.

Control of the reaction between the urea and the cellulose is a significant element in the production of a suitable film product, particularly sausage casing. It has been found that once the minimal reaction temperature necessary to form the cellulose aminomethanate is attained, degradation of the cellulose structure begins and the obtaining of suitable film material involves a balancing of appropriate reaction completion with the prevention of significant degradation. Thus, a key element to quality of product has involved the determination of when an adequate quantity of urea has been reacted with the cellulose.

Interestingly, it has also been found that the method utilized to uniformly distribute the urea reactant within the cellulose structure, particularly the method used to remove the excess base, has a significant effect upon the degree of completion necessary in the reaction between the urea and cellulose to produce a suitable film product. For example it has been found that when the distribution method involves low concentration aqueous caustic steeping, and the excess caustic is partially removed, or neutralized, the theoretical percentage of urea which must be reacted to form a suitable commercial product is greater than when the product has been steeped in high concentration aqueous caustic solutions and the excess caustic is completely removed.

A convenient and accurate determination of the progress of the reaction can be attained by measuring the weight loss of the dry reaction mixture, theoretically due to the loss of ammonia according to the reaction path:

$$\text{Cell-OH} + \text{CO(NH}_2)_2 \rightarrow \text{Cell-OCONH}_2 + \text{NH}_3$$

Thus, regardless of the process used to attain the intimate urea/cellulose dry mixture, when the weight loss of the dried reaction mixture is factored as the weight of ammonia generated during the heating process, in accord with the above reaction path, a reliable measure predictive of the quality of the reaction product is provided. Such measure can be conveniently quantified by comparison to urea decomposition. One particularly convenient quantified scale comprises the measure based upon direct comparison to urea decomposition, e.g. % urea decomposed. A less convenient quantified scale comprises a measure indirectly based upon urea decomposition and involves comparison to the cellulose being reacted, e.g. % completion of reaction.

In the process of this invention, a measure of percent urea decomposition can thus be attained using the relationship:

$$\frac{\text{Reaction Mass Weight loss after drying}}{\text{Urea Reactant Weight (calculated as NH}_3)} \times 100$$

The measure of the % cellulose reacted can be similarly attained by using the relationship:

$$\frac{\text{Reaction Mass Weight loss calculated as mols. NH}_3}{\substack{\text{Cellulose reactant} \\ \text{weight calc. as mols. anhydroglucose units}}} \times 100$$

Where the process utilizes a low concentration caustic urea steeping solution (2%–12%) which is incompletely removed prior to heating, a weight of ammonia generated theoretically equivalent to about 95%–100% calculated urea decomposition (also representing 95–100% urea add-on to the available cellulose) provides consistently good quality soluble cellulose aminomethanate for use in manufacturing films such as sausage casings.

When the process utilizes caustic concentrations which were neutralized with an acidic solution, or treated with an ion exchanger, a weight of ammonia generated theoretically equivalent to about 30%–70% calculated urea decomposition provides consistently good quality soluble cellulose aminomethanate for manufacturing films such as sausage casing. The same 30–70% equivalency of ammonia generation applies to a liquid ammonia steeping process. It is stressed, however, that it is essential that the ammonia generated from volatilization of the liquid ammonia be distinguished from the ammonia generated from the decomposition of urea. Thus, there is variation in the theoretical equivalent amount of urea decomposition which is appropriate to achieve good quality films. Depending upon the residual caustic from the various steeping processes used in obtaining the uniform intimate mixture of reactants, consistency of the final product is directly measurable from the theoretical generation of ammonia.

Generally, when using an indirect comparison scale comprising percentage reaction quantification, the preferred products are attained in the above various processes when between about 110% and about 140% extent of reaction is calculated.

As can be seen, the above monitoring and control process can utilize the intimate urea/cellulose dry mixture attained from multiple of the prior art processes including the liquid ammonia and various high, medium and low concentration caustic treatments described in various of the prior art patents and the applications previously described.

In the practice of this process, the intimate cellulose/urea reactant mixture typically comprises a pressed cake which may have a water content well above 50% or more. Thus, the initial heating of the pressed cake typically constitutes a drying of the cake with concomitant evaporation of water therefrom which must be taken into consideration when measuring the weight loss of the reactant mixture for purposes of this invention. Generally, the cake itself will not reach the minimum temperatures of this invention until essentially all of the water has been evaporated therefrom. In addition, no significant reaction appears to occur between the cellulose and the urea until most of the water (95% or greater) has been removed from the pressed cake through drying. Knowing the dry weight of the starting cellulose pulp and the concentrations of the initial and depleted treating solutions, the composition of the pressed cake can be easily calculated by means known in the chemical arts. The known composition of the pressed cake allows for ready determination of the calculated dry weight of the urea/cellulose components and, by weight loss, of the extent of water removal. From a practical experience, weight-loss/time, due to drying of a pressed cake progresses rapidly until only trace amounts of water are present, then weight-loss/time slows appreciably beginning with the reaction of the cellulose with the urea, with concomitant release of gaseous ammonia.

For purposes of this invention the change in weight of the dry reactant mixture itself and/or the weight of the gaseous products removed may be measured. The weight loss can be directly measured or may be derived through, for example, the concentration of ammonia released. Multiple different means can be utilized to determine the weight loss and each is meant to be incorporated herein.

The process of this invention is particularly useful when cellulose is treated with urea in caustic solutions and most useful when low caustic concentrations (2–10%) are used in accord with the aforedescribed applications. Generally, when using low concentrations of caustic it is also desirable to use the lower steeping temperatures disclosed in the foregoing identified applications, from about $-15°$ to about $+10°$ C.

The concentration of urea necessary in an aqueous alkaline steep solution to provide adequate reactant for the formation of cellulose aminomethanate generally ranges from about 12 to about 35% urea by weight and preferably from about 15 to about 30% by weight. A preferred aqueous solution would contain from about 4 to about 8% caustic and from about 15 to about 30% urea by weight.

The volume of aqueous solution used in the steeping process is generally preferred to be minimized to reduce waste products. The volume of aqueous component must be sufficient to assure wetting of the cellulose while containing adequate quantities of caustic to swell the cellulose and urea to react therewith. Thus, the greater the concentration of caustic, the less volume may be utilized. Generally, when using low caustic concentrations, a ratio of combined caustic and urea containing aqueous solution to cellulose should be less than about 15:1 and preferably less than about 10:1.

Generally, in processing of a cellulose pulp slurry, steeping at an appropriate temperature for from about 15 minutes to an hour is adequate. The slurry should be steeped for an amount of time sufficient to swell the cellulose and allow migration of the urea into the cellulose structure, however, steeping can be continued for longer times as long as no significant adverse effect is imposed upon the cellulose structure.

Removal of the caustic or neutralization of the steeped slurry is typically the next step in the steeping process and either may be accomplished as a part of the steeping process or as a separate step if desired.

Removal of the caustic can be achieved by multiple washings and/or pressings of the pulp using water containing dissolved urea or by ion exchange extraction. The pressing step acts to both rid the slurry of its aqueous component while embedding the urea in the swelled cellulose. The washing step, with dilute urea, acts to disperse remaining salts and assure an excess of urea. The washed slurry is then filtered and/or centrifuged to a desired pressed weight ratio(PWR), which is calculated by dividing the wet weight of the pad by the weight of the dry cellulose starting material.

Another method of caustic removal is to suspend the steeped cellulose/caustic/urea in an aqueous urea solution, mix the solution thoroughly, pump the mixed solution through a filter into an ion-exchanger and re-circulate back into the original suspension. Such process can produce a salt-free, cellulose/urea product suitable for forming the cellulose aminomethanate. However, since the original alkaline suspension typically contains soluble cellulose fractions which can precipitate inside the ion-exchange resin, such process should be carefully filtered.

Neutralization can be achieved by simply adding an appropriate amount of an acidic neutralizing solution to the steeping solution.

Neutralization can be carried out with any acid neutralizing agent such as sulfuric, acetic or any suitable inorganic acid, organic acid, or anhydride of an acid, such as carbon dioxide. The acid solution can be of varying strengths and may or may not contain additional amounts of urea. Urea is typically added when the urea concentration of the initial steep solution was low.

The direct neutralization technique can be applied to low caustic low temperature steeping, high caustic room temperature steeping and any combination of conditions. It can also be applied to separately mercerized, alkali cellulose crumb as produced in commercial viscose processes, by subsequent steeping in aqueous urea before neutralization.

Separation of the cellulose-urea from the neutralized or caustic free and/or reduced caustic steeping liquor is typically the next step in the treatment process. Removal of the liquor can be attained by filtration, pressing, centrifugation or other methods of the prior art.

After caustic removal or neutralization, and separation of the cellulose/urea mixture, the recovered liquor contains urea and may also contain the salt of the neutralizing acid with few, if any, dissolved cellulose fragments. Thus the liquor can be simply and conveniently regenerated through an ion-exchanger and be re-used after appropriate adjustment of concentrations. Surprisingly, the sodium sulfate left in the cellulose/urea mixture when using sulfuric acid neutralizing solution does not appear to adversely affect the subsequent thermal reaction to form the cellulose aminomethanate. Interestingly sodium salts of any nature appear not to affect the thermal reaction.

The resulting impregnated cellulose can then be cured in accord with the process of the invention and frequently results in little discoloration or significant degradation.

The following examples are provided to exemplify the invention and are not meant to be a limitation thereof.

EXAMPLE I

Ten (10) grams of cellulose (510–550 $DP_v$ Buckeye V-65 pulp) was added to 200 g of 20% urea in 0.5% sodium hydroxide and macerated in a Waring blender. The mixture was allowed to stand 30 minutes at room temperature followed by 1 hour at 0° C. The mixture was then brought back to approximately room temperature and filtered on a Buchner funnel, using a polypropylene filter mat, under suction to form a 31.2 g. pressed cellulose-urea cake. The pressed cake was directly placed in a 150° C. forced air oven and heated until the weight became 12.7 g (approx. 75 minutes).

A portion of the product, representing 8.4 g of cellulose, was washed with water, filtered, placed in a tared beaker and mixed with a solution containing 37 g of 4.8% ZnO in 24% aqueous NaOH (the water was ice-cold). The final composition was in the ratio of 7:1.5:7.4:84.1 of Cellulose:ZnO:NaOH:Water.

On cooling the above mixture to $-5°$ C., a clear viscous solution was obtained. The solution was aged two days, alternately at 0° C. and room temperature, centrifuged and converted into handcast films using a 30 mil drawbar. On coagulation-neutralization, washing and drying the clear transparent films showed rewet Mullen burst strengths of 14.3–17 psi.

EXAMPLE II

Twenty (20) grams of cellulose (510–550 $DP_v$, Buckeye V-65 sheet pulp) was added to 200 grams of a steeping solution consisting of 5% (W/W) sodium hydroxide and 30% (W/W) urea at about room temperature. The sheet structure was broken to make a uniform slurry with the help of a spatula and the slurry was cooled overnight in a $-16°$ C. freezer. The next day, the slurry was neutralized with 100 g of 12.25% aqueous sulfuric acid to a final pH of 9.3. The cellulose-urea-sodium sulfate mixture was collected on Whatman 541 filter paper over a Buchner funnel under suction. Excess liquid was squeezed out of the pad and into the filtrate using a rubber dam. The pressed weight of the resulting cellulose urea pad was 83.2 g and had a pressed weight ratio (PWR) of 4.16. The filtrate did not show any significant amount of precipitated cellulose on further acidification and standing overnight. The composition of the pressed cake was calculated from the PWR and concentrations of starting and spent solutions to have a 63% urea add-on, 19% sodium sulfate add-on, and a calculated dry weight of 36.4 g.

The pressed cake was placed in a 150° C. forced air oven for initial drying and maintained there for thermal decomposition. The progress of the reaction was monitored by weighing the material at various times and/or decomposition intervals. When the sample reached a calculated dry weight of about 36.4 g, further weight loss was considered as comprising ammonia loss. Samples representing 5 g of starting cellulose were taken out as shown in Table 1.

TABLE I

| Time (min) | Weight (grams) | Extent of Reaction (% urea dec.) | Sampling |
|---|---|---|---|
| 0 | 83.2 | — | |
| 20 | 66.3 | | Drying |
| 42 | 53.2 | | Drying |
| 70 | 41.5 | | Drying |
| 87 | 37.25 | | Drying |
| 100 | 35.45 | 27 | |
| 110 | 35.05 | 38 | Sample 1, 8.76 g taken |
| 125 | 25.86 | 54 | Sample 2, 8.62 g taken |
| 140 | 17.02 | 67 | Sample 3, 8.51 g taken |
| 155 | 8.30 | 89 | Sample 4, 8.30 g taken |

A plot of weight versus time showed an early curvature typical of a drying curve and a later linear representation. On an expanded scale, the linear representation appeared as a zero order kinetic plot as expected from the solid phase reaction.

The solubility of each of the four samples (TABLE I) in 9% aqueous NaOH/1% ZnO was tested. Two-fifths of each sample, representing 2 g of cellulose, was washed three times with lukewarm water, filtering each time through a Whatman 541 filter on a Buchner funnel under suction. The water content of the washed product was then adjusted to 20 g and 10 g of a solvent concentrate, made as 27% NaOH and 3% ZnO, was added. The mixture was stirred at room temperature, all small lumps were broken, and a uniform slurry was produced within a short time. The mixture was then cooled by dipping into a methanol-filled cryobath maintained at $-16°$ C. Within 5–10 minutes, clear, fiber-free solutions were obtained from samples 2 and 3, but not from samples 1 and 4. Even after prolonged cooling of samples 1 and 4, undissolved fibers could be seen under polarized light. This demonstrates that the most readily soluble products were obtained when the extents of reaction corresponded to 50–70% urea decomposition at 50–70% urea loading.

Sample 2 visually appeared to have the lowest viscosity, at 22°–23° C., of the samples. When the solution became bubble-free on standing for 0.5–1 hour, a handcast film was made on a glass plate using a 30 mil drawbar. The film was coagulated and neutralized in a conventional acid-salt bath used for viscose coagulation-regeneration. Excess acid and salt were then washed off and the neutral film was mildly plasticized with 2% aqueous propylene glycol and dried on a plastic hoop overnight at room temperature. The next day, the rewet Mullen Burst Strength of the 38–40 g/m² film was found to be 12.5 psi.

The remaining 3 g cellulose derivative samples of each part were washed, dried and analyzed for nitrogen and average degree of polymerization ($DP_V$). Each sample's degree of aminomethanate substitution (DS) was calculated directly from its nitrogen content. The results are presented in TABLE II.

TABLE II

| Sample | % N | Calc. DS | $DP_V$ average |
|---|---|---|---|
| 1 | 0.50 | 0.06 | 502 |
| 2 | 0.90 | 0.11 | 494 |
| 3 | 1.10 | 0.13 | 495 |
| 4 | 1.54 | 0.19 | 509 |

EXAMPLE III

Twenty (20) grams of cellulose (Buckeye V-60 pulp, average $DP_V$ 670), was treated in the same way as in Example II, to a PWR of 3.82. Calculations from PWR, starting and final solution concentrations gave a urea add-on of 56.3%, a sodium sulfate add-on of 16.7% and a calculated dry weight of 34.6 g. TABLE III contains the thermal treatment results.

TABLE III

| Time (min) | Weight (grams) | Extent of Reaction (% urea dec.) | Sampling |
|---|---|---|---|
| 0 | 76.3 | Start | |
| 20 | 58.3 | Drying | |
| 42 | 44.9 | Drying | |
| 70 | 35.0 | almost dry | |
| 87 | 33.35 | 39 | Sample 1, 8.34 g taken |
| 100 | 24.73 | 52 | |
| 110 | 24.36 | 67 | Sample 2, 8.12 g taken |
| 125 | 16.05 | 78 | Sample 3, 8.03 g taken |

TABLE III-continued

| Time (min) | Weight (grams) | Extent of Reaction (% urea dec.) | Sampling |
|---|---|---|---|
| 140 | 7.88 | 97 | Sample 4, 7.88 g taken |

A plot of weight versus time was found to be similar to that of Example II. Solubility in caustic/zincate solvent, nitrogen content, DS and $DP_v$ of the four samples are shown in TABLE IV.

TABLE IV

| Sample | Solubility | % N | DS | $DP_v$ |
|---|---|---|---|---|
| Sample 1 | Poor | 0.66 | .08 | 534 |
| Sample 2 | Excellent | 1.26 | .15 | 565 |
| Sample 3 | Fair | 1.28 | .15 | 559 |
| Sample 4 | Poor | 1.27 | .15 | 550 |

By visual comparison, the solution from sample 4 was most viscous and that from sample 2 was least viscous.

EXAMPLE IV

Two hundred (200) grams of cellulose (Buckeye V-65, 510–550 $DP_v$ sheet pulp) was added to 2000 g of steeping liquor made up of 8% sodium hydroxide and 20% urea. The sheet structure was broken to a uniform slurry with a mechanical stirrer and the mixture was cooled overnight in a freezer at $-16°$ C.

The next day, the mixture was neutralized with 1000 g of an acidic urea solution containing 19.6% sulfuric acid and 20% urea, mixed thoroughly, and filtered to obtain a wet pressed weight of 927 g. The PWR was calculated to be 4.635. The filtered cake was then broken by hand into smaller fragments, placed in a wire basket lined with a porous paper, dried initially at 102° C., then at 125° C., 130° C. and finally maintained at 150° C.

The composition, determined from the PWR, starting and final solution concentrations, was calculated to have a urea add-on of 72.7%, a sodium sulfate add-on of 20.7% and a calculated dry weight of 387 g. The data relative to thermal reaction is presented in TABLE V.

TABLE V

| Time (min) | Weight (grams) | Extent of Reaction (% urea dec.) | Comments |
|---|---|---|---|
| 0 | 927 | Initial wt. | Left overnight @ room temp. |
| 0 | 869 | Start | |
| 30 | 805 | Drying | |
| 60 | 738 | Drying | Oven temp. raised to 125° C. |
| 90 | 665 | Drying | |
| 120 | 597 | Drying | |
| 150 | 536 | Drying | |
| 180 | 478 | Drying | Oven temp. raised to 130° C. |
| 210 | 446 | Drying | |
| 240 | 408 | Drying | Oven temp. raised to 150° C. |
| 280 | 381 | 14 | $NH_3$ odor |
| 300 | 374 | 31 | Strong $NH_3$ odor |
| 315 | 371 | 38 | Strong $NH_3$ odor |
| 325 | 368 | 48 | Sample 1, 18.4 g taken |
| 345 | 346 | 57 | Sample 2, 310 g taken |
| 360 | 34.2 | 100 | Sample 3, 34.2 g taken |

The calculated amounts of cellulose in each of the three samples were: Sample 1, 10 g; Sample 2, 170 g; Sample 3, 20 g.

Portions of each sample were tested for solubility in 9% NaOH with and without ZnO. Other portions were washed, dried and analyzed for nitrogen and $DP_v$. DS was calculated from the nitrogen and cellulose content. The results are presented in TABLE VI.

TABLE VI

| Sample | Solubility with ZnO | Solubility w/o ZnO | Calc. % N | Calc. DS | Calc. DP |
|---|---|---|---|---|---|
| 1 | Good | Poor | 1.02 | .12 | 448 |
| 2 | Excellent | Good | 1.46 | .18 | 440 |
| 3 | Good | Good | 2.11 | .26 | 490 |

On freezing and thawing, the solutions without ZnO gelled much earlier than the ones with ZnO.

Another solution of Sample 2 was made at 7.7% cellulose concentration and a film was cast using a 22 mil drawbar. Processing and drying the film as in Example II gave a rewet Mullen burst strength of 11 psi at 37.5 $g/m^2$ basis weight.

EXAMPLE V

Fifteen (15) kilograms of cellulose (Buckeye V-65, 530 $DP_v$ pulp) was slurried into 300 kg of an aqueous solution of 6% sodium hydroxide and 25% urea, in a 200-gallon mixer. The slurry was passed through an attrition mill to insure comminution and thorough mixing. The slurry was then cooled to $-8°$ C. through a scraped surface heat exchanger, warmed to 17° C., and neutralized with 65 kg of an aqueous acid solution containing 34% sulfuric acid and 25% urea.

The neutral slurry was filtered through a flat-bed suction filter device to produce eight approximately equal cellulose-urea pads. Each pad was placed in a tared wire frame, dried to a constant weight, sampled for analysis of its composition, and then heated at 150° C. while monitoring the weight at various intervals. The extent of reaction was calculated as mole percent of ammonia lost, based on moles of anhydroglucose unit in the cellulose, instead of % of urea decomposed that was used in the previous examples. The results are shown in Table VII.

TABLE VII

| Pad# | Dry Pad wt (kg) | Cellulose wt (kg) | Cured Pad wt (kg) | Extent of Reaction (%) | Reaction Time (min) |
|---|---|---|---|---|---|
| 1 | 3.20 | 1.48 | 3.02 | 118 | 175 |
| 2 | 3.32 | 1.50 | 3.12 | 128 | 113 |
| 3 | 3.49 | 1.56 | 3.29 | 128 | 85 |
| 4 | 3.22 | 1.49 | 3.02 | 122 | 112 |
| 5 | 3.21 | 1.55 | 3.00 | 133 | 114 |
| 6 | 3.10 | 1.57 | 2.91 | 119 | 160 |
| 7 | 3.46 | 1.64 | 3.12 | 198 | 85 |
| 8 | 3.08 | 1.52 | 2.90 | 110 | 115 |

The variation of reaction time from 85 minutes to 175 minutes to achieve a desired 110–140% reaction, that is, loss of 1.10 to 1.40 moles of ammonia per mole of anhydroglucose unit in the cellulose, indicates that the heating environment could not heat all the pads uniformly. In fact, each pad was turned around at approximately midpoint of their target weight-loss in order to minimize any large variation of the extent of reaction within the various parts of the pad. Sample #7 was inadvertently placed in an oven hot spot and unexpectedly went to 198% reaction in a very short time. This result was thrown out as not representative because the product was obviously over reacted and would be of poor quality based on previous findings of inferior solubility of over reacted materials.

Pads 1–6 and 8 were combined and slurried in ambient water then comminuted by passing through an attrition mill. Excess water was partially removed and the wet material was reslurried in aqueous sodium hydroxide solution to a final composition of cellulose to NaOH to water of 7.0: 7.5: 85.5 respectively.

Cooling the slurry to −7° C. through a scraped surface heat exchanger provided a clear, fiber-free, viscous solution of light tan color. The solution was filtered, de-aerated and then treated by a conventional viscose coagulation/regeneration process to produce approximately 700 feet of fiber reinforced sausage casing, commonly known in the trade as fibrous casing. The resulting casing appeared to have slightly less strength than typical commercial viscose-reinforced fibrous casing.

Semi-dry sausages were made with this casing without encountering any unusual breakage or other problems. Analysis of the casing under a scanning electron microscope showed a somewhat higher population of voids at the fiber-matrix interface than the viscose derived product. This might explain the slightly lower strength property observed.

What is claimed is:

1. In a process for synthesizing cellulose aminomethanate, wherein cellulose is steeped in a urea containing solution, dried to form an intimate mixture of cellulose and urea of known composition, and heated to form the cellulose aminomethanate; the improvement comprising, heating the dried intimate mixture to a temperature above about 125 degrees centigrade, measuring the weight loss of the mixture as a result of heating, comparing the measured weight loss of the mixture to the known weight of an equivalent amount of ammonia released in accord with the reaction path:

$$\text{Cell-OH} + \text{CO(NH}_2)_2 \rightarrow \text{Cell-OCONH}_2 + \text{NH}_3$$

continuing heating until the measured weight loss corresponds to the weight of an amount of ammonia released in the reaction when from about 30 to about 100% of the total weight of urea present in the mixture reacts with cellulose.

2. The process of claim 1 wherein the steep solution comprises aqueous caustic, the caustic is neutralized with an acidic neutralizing solution, and a neutral liquor containing urea and a salt of the neutralizing solution is removed prior to heating.

3. The process of claim 2 wherein the neutral liquor is regenerated, after removal, and recycled.

4. The process of claim 1 wherein the cellulose is steeped in liquid ammonia in the presence of urea.

5. The process of claim 3 wherein the acid of the neutral liquor is regenerated and recycled.

6. The process of claim 4 wherein at least one of urea and liquid ammonia is regenerated and recycled.

7. The process of claim 2 wherein the intimate mixture is neutralized, before forming the cellulose aminomethanate, by the addition of an organic acid.

8. The process of claim 2 wherein the intimate mixture is neutralized, before forming the cellulose aminomethanate, by the addition of an inorganic acid.

9. The process of claim 1 wherein the mixture is washed, before forming the cellulose aminomethanate, with aqueous urea.

10. The process of claim 7 wherein the acid solution is regenerated and recycled.

11. The process of claim 8 wherein the acid solution is regenerated and recycled.

12. The process of claim 9 wherein the aqueous urea is separated from the mixture and recycled.

13. The process of claim 10 wherein the acid is regenerated by passing through an ion-exchanger.

14. The process of claim 11 wherein the acid is regenerated by passing through an ion-exchanger.

15. The process of claim 1 wherein the comparison comprises quantification of percentage urea decomposition.

16. The process of claim 1 wherein the comparison comprises quantification of percentage reaction completion.

17. The process of claim 1 wherein cellulose is slurried with an aqueous solution comprising from about 2 to about 10% by weight caustic and about 12 to about 35% by weight urea, in a cellulose:aqueous solution weight ratio of from about 1:6 to about 1:15, steeped at a temperature from about 0 degrees centigrade to about −10 degrees centigrade for a time sufficient to form a mixture of swelled cellulose intermingled with urea, neutralized by the addition of an aqueous acidic solution and thereafter heated to form the cellulose aminomethanate.

18. The process of claim 17 wherein the aqueous acidic solution also comprises urea.

19. The process of claim 17 wherein the aqueous acidic solution comprises an inorganic acid.

20. The process of claim 17 wherein the mixture is filtered before heating.

21. Cellulose aminomethanate, produced by a process wherein cellulose is slurried, in a weight ratio of from about 1:6 to about 1:15, with an aqueous solution comprising from about 2 to about 10% by weight caustic and from about 12 to about 35% by weight urea, steeped at a temperature from about 0 degrees centigrade to about −10 degrees centigrade for a time sufficient to permit swelling of the cellulose and distribution of the urea to available hydroxy units within the swelled cellulose structure, neutralized by the addition of an acidic solution, and heated to a temperature sufficient to cause reaction of the urea with the cellulose structure.

22. The cellulose aminomethanate of claim 21 wherein from 0.5 to 30 numerical percent of the cellulose hydroxy groups have been substituted with aminomethanate groups.

23. A tubular sausage casing comprising the cellulose aminomethanate of claim 21.

* * * * *